US012734980B2

(12) United States Patent
Binder et al.

(10) Patent No.: US 12,734,980 B2
(45) Date of Patent: Sep. 15, 2026

(54) METHOD FOR OPERATING A MOTOR VEHICLE, FOR MAKING SETTINGS ON A MOTOR VEHICLE, FOR OPERATING A SERVER, MOTOR VEHICLE, DATA PROCESSING DEVICE, METHOD FOR MANAGING DATA ON A MOTOR VEHICLE AND COMPUTER PROGRAM

(71) Applicant: AUDI AG, Ingolstadt (DE)

(72) Inventors: Andreas Sebastian Binder, Hepberg (DE); Andreas Unger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 127 days.

(21) Appl. No.: 18/532,163

(22) Filed: Dec. 7, 2023

(65) Prior Publication Data

US 2024/0208440 A1 Jun. 27, 2024

(30) Foreign Application Priority Data

Dec. 22, 2022 (DE) ......................... 102022134638.2

(51) Int. Cl.
*B60R 16/023* (2006.01)

(52) U.S. Cl.
CPC ................................ *B60R 16/0231* (2013.01)

(58) Field of Classification Search
CPC ... B60R 16/0231; B60R 16/037; H04L 67/12; H04L 9/50
See application file for complete search history.

(56) References Cited

U.S. PATENT DOCUMENTS

| | | | | |
|---|---|---|---|---|
| 2021/0133713 | A1 | 5/2021 | Wang et al. | |
| 2023/0162544 | A1* | 5/2023 | Hua | H04W 12/069 340/5.72 |
| 2023/0370267 | A1* | 11/2023 | Foligno | H04L 9/083 |
| 2024/0046340 | A1* | 2/2024 | Tsujino | G06Q 30/0643 |
| 2024/0061917 | A1* | 2/2024 | Wang | G06Q 10/0639 |
| 2024/0113881 | A1* | 4/2024 | Johar | H04L 9/0825 |

FOREIGN PATENT DOCUMENTS

| | | | |
|---|---|---|---|
| DE | 102016007472 | A1 | 12/2017 |
| DE | 102020105854 | A1 | 9/2020 |
| DE | 102022000646 | A1 | 8/2023 |

OTHER PUBLICATIONS

Bergander., "Top 7: Used cars with celebrity", Mobile.de, Nov. 6, 2019, 22 pages.
Städeli., "Blockchain industry Switzerland celebrates break-through", PWC, Nov. 29, 2020, 5 pages.
Maeder., "Sygnum breaks the sound barrier at the Tokenization of assets", Moneytoday, Jul. 15, 2022, 4 pages.
Examination Report issued on Nov. 6, 2023, in corresponding German Application No. 102022134638.2, 26 pages.

* cited by examiner

*Primary Examiner* — Jessica Lemieux
(74) *Attorney, Agent, or Firm* — Maier & Maier, PLLC

(57) ABSTRACT

A method for operating a motor vehicle includes minting a non-fungible token (NFT), which links an identifier for a first, in particular prominent, user with an identifier for the motor vehicle, and with data for describing a setting made by or for the first user, as well as the later reading of the data describing the settings made from the NFT based on the identifier for the motor vehicle, and the setting is restored for use by a second user on the same motor vehicle.

8 Claims, 1 Drawing Sheet

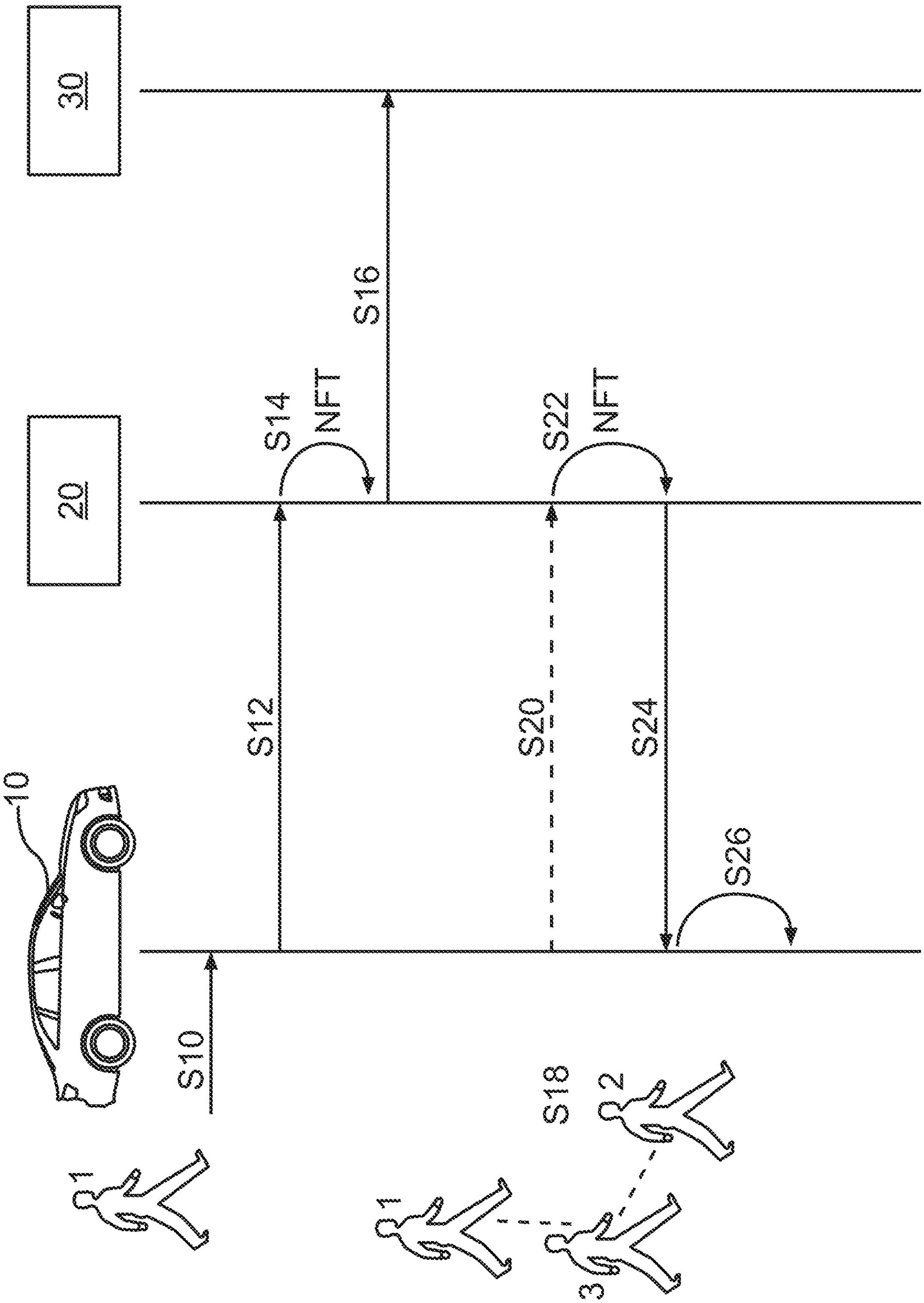
30
20
10
S10
S12
S14
NFT
S16
S18
S20
S22
NFT
S24
S26
1
1
2
3

METHOD FOR OPERATING A MOTOR VEHICLE, FOR MAKING SETTINGS ON A MOTOR VEHICLE, FOR OPERATING A SERVER, MOTOR VEHICLE, DATA PROCESSING DEVICE, METHOD FOR MANAGING DATA ON A MOTOR VEHICLE AND COMPUTER PROGRAM

FIELD

The invention relates to a method for operating a motor vehicle, a method for making settings on a motor vehicle, a method for operating a server for motor vehicle applications, a motor vehicle, a data processing device that is designed to function as a server, a method for managing data to a motor vehicle and a computer program product.

BACKGROUND

The idea is based on the popularity of used cars with previous celebrity owners. Something similar is described, for example, in the magazine mobile.de, available on May 31, 2022 at: https://www.mobile.de/magazin/artikel/top-7-gebrauchtwagen-mit-promi-vorbesitz-16474. Among other things, it became known several years ago that a Volkswagen Golf once driven by the former Pope John Paul II was sold at a high price. From the NZZ am Sonntag, which can be found at: https://www.pwc.ch/de/press-room/interviews/pwc_press_20201129_nzz.pdf on May 31, 2022, it is known that blockchains can also be used to trade classic cars, wherein rights to the classic car can also only involve a share of the classic car.

DE 10 2016 007 472 A1 describes a method for registering a vehicle data record using a blockchain. The method stores the vehicle data record, in particular the logbook, vehicle identification, chassis number and/or other types of usage by using the blockchain (in particular decentralized and public blockchains).

US 2021/0133713 A1 discloses a system for managing asset rights based on distributed ledger networks—such as blockchain or DAG. In this context, a so-called non-fungible token is created, which represents the right to use the asset.

Trading in vehicles that have a previous celebrity owner is based heavily on the trust that the buyer has in the dealer. In particular, if the motor vehicle was only made available by lending it (such as by a car manufacturer for the members of a prominent football team), the user is not listed in the vehicle registration document.

SUMMARY

It is the object of the invention to show a way in which trading in vehicles that have had prominent previous users can be made more attractive.

The object is achieved by a method for operating a motor vehicle, a method for making settings on a motor vehicle, a method for operating a server for motor vehicle applications, a motor vehicle, a data processing device, a method for managing data on a motor vehicle and a computer program product.

The method according to the invention for operating a motor vehicle comprises:

- making a setting regarding at least one actuator by or for a first user, in particular a prominent user, of the motor vehicle;

- minting an NFT that links an identifier for the first user with an identifier for the motor vehicle and with data for describing the setting made;
- storing the NFT on a blockchain;
- reading the data from the NFT to describe the setting made based on the identifier for the motor vehicle;
- restoring the setting for use by a second user on the same motor vehicle.

The invention therefore uses a non-fungible token (non-exchangeable token, sometimes also translated as a non-replaceable token). By storing the NFT in a blockchain according to standard, a high level of legal security is ensured. The method enables the second user to acquire the NFT together with the motor vehicle and to have the settings made by or for the first user provided to them.

The method according to the invention for making settings on a motor vehicle comprises:

- making a first setting regarding at least one actuator;
- transmitting data describing (at least one) setting to a server;
- changing the setting to create a second setting;
- receiving the data describing the first setting from the server;
- restore the first setting.

(The data describing the setting may have been deleted before receiving them. This is the main concept of the invention). The invention is based on the fact that it is known to automatically restore settings. This applies in particular to motor vehicles that are used by multiple drivers. In these motor vehicles, however, a driver profile is stored in the motor vehicle itself. The data describing the setting is not transmitted to a server and later transmitted back again.

The method according to the invention for operating a server for motor vehicle applications relates in particular to a server such as those operated by a car manufacturer, car rental service and the like. The method comprises receiving data related to a setting applicable to a first user with regard to at least one actuator of a first motor vehicle, minting an NFT that links an identifier for the first user with an identifier for the first motor vehicle and with data for describing the setting made, sending the NFT to a blockchain so that the NFT is stored there, later reading out the data to describe the (at least one) setting from the NFT and sending the data to the first motor vehicle.

The advantages of the method of operating a server are included in the above-mentioned advantages of operating a motor vehicle.

In the three different methods mentioned above, the setting for at least one actuator can affect at least one of:

- a setting related to the color and/or the intensity of the lighting of the passenger compartment of the motor vehicle; and or
- a setting of the vehicle systems as used when driving, for example the steering wheel setting (like the one used by the celebrity); and or
- a setting related to driver assistance systems (selection and characteristics, i.e. whether the driver assistance system is used at all and to what extent; this can also include, for example, the setting of the external mirror, interior mirror and the like); and or
- a setting related to a vehicle seat; and or
- a setting related to displays (such as the screen backgrounds displayed for the celebrity); and or
- a setting related to another customizable system in the motor vehicle.

The motor vehicle according to the invention comprises:

at least one actuator on which or for which individualized settings can be made;

means for storing the customized setting in the form of data describing the setting;

means for restoring a customized setting after a change.

According to the invention, the motor vehicle comprises a device which is designed to transmit the data describing the setting to an external server and a device which is designed to receive such data describing the setting from the external server.

The motor vehicle according to the invention is preferably designed such that the setting affects at least one of the above-mentioned list of settings.

The data device according to the invention is designed to function as a server and to implement the method described above for operating a server, also in a preferred embodiment of the same.

The method according to the invention for managing data on a motor vehicle, in which an NFT is minted which links an identifier for users of the motor vehicle with an identifier for the motor vehicle, includes according to the invention that the NFT additionally links a parameter for indicating the prominence of a user of the motor vehicle to the identifiers (for the user and for the motor vehicle). This parameter can be purely binary, for example, where the: "1" stands for the prominence of a previous owner and the "O" denotes a previous owner who is not prominent. The parameter can also indicate a degree of prominence, for example by specifying a number between 1 and 10, or between 1 and 4, and the like. The parameter can also be specified as a word identifier or letter code etc. In the method, the parameter can be read from a directory. For example, Who's Who®, the well-known directory of celebrities, can be used to determine whether a user is prominent or not according to the identifier. The method for managing data thus introduces a measure of prominence as additional information in the NFT. Preferably, the method for managing data in a motor vehicle is carried out as part of the method according to claim 1 or according to claim 3 (as part of the minting of the NFT in these methods).

According to a preferred embodiment of the method for managing data related to a motor vehicle, a unique identification number (for the NFT itself) and/or a user contract with a prominent user are also linked to the further data for the NFT. In this way, the way in which the celebrity used the motor vehicle can also be read from the NFT. According to the example above, a buyer of the motor vehicle can use the associated NFT to recognize that a member of the football team was given the motor vehicle on loan.

The computer program product according to the invention defines a computer program which, when executed on a data processing device, implements the method for managing data relating to a motor vehicle.

For applications or situations that can arise in the method and which are not explicitly described here, according to the method, an error message and/or a request for user feedback input can be issued and/or a default setting and/or a predetermined initial status can be set.

The invention also includes further developments of the method according to the invention, which have characteristics as already described in the context of the developments of the motor vehicle according to the invention and vice versa. For this reason, the corresponding developments are not described once again here.

The motor vehicle according to the invention is preferably designed as an automobile, in particular as a passenger car or truck, or as a passenger bus or motorcycle.

As a further solution, the invention also comprises a computer-readable storage medium, comprising commands which, when executed by a computer or a computer network, cause it to execute an embodiment of the method according to the invention. The storage medium can be embodied, for example, at least partially as a non-volatile data memory (such as a flash memory and/or as an SSD—solid state drive) and/or at least partially as a volatile data memory (such as a RAM—random access memory). However, the storage medium can also be operated, for example, as a so-called app store server on the Internet. A processor circuit with at least one microprocessor can be provided by the computer or computer network. The commands can be provided as binary code or assembler and/or as source code of a programming language (such as C).

The invention also comprises the combinations of the features of the described embodiments. The invention therefore also comprises implementations that each comprise a combination of the features of several of the described embodiments, provided that the embodiments have not been described as mutually exclusive.

BRIEF DESCRIPTION OF THE FIGURE(S)

Exemplary embodiments of the invention are described hereinafter, wherein the only FIGURE illustrates steps of the method according to the invention for operating a motor vehicle.

DETAILED DESCRIPTION

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

The FIGURE illustrates the interaction between a motor vehicle 10, which is initially driven by a prominent user 1, a server 20 for motor vehicle applications, such as that operated by the automobile manufacturer, and a blockchain 30. The motor vehicle 10 is later to be handed over (in particular sold) to a user 2, if necessary after a user 3 has driven the motor vehicle 10 in the meantime. User 1 is also referred to as "first user" within the scope of the present description and claims, which refers to the method, and thus not necessarily to the absence of an even earlier user.

The method starts with step S10, the making of settings by or for the prominent user 1. The settings can, for example, relate to a customizable system in the motor vehicle such as the vehicle seats or the lighting of the passenger compartment. The motor vehicle 10 receives the input to make the settings. In step S12, the motor vehicle 10 transmits data to the server 20, which data describe the (customized) settings made on/in the motor vehicle 10. The server 20 receives this data. In step S14, server 20 mints a non-fungible token, NFT, (from English "to mint", whereby "minting" can also be simply replaced by "creating". When minting an NFT, several pieces of information are linked together. In the present case, these contain an identifier for the first user 1. The identifier can already be known in the server 20 because the car manufacturer has made the motor vehicle 10 available to the prominent user 1. Optionally (not shown in the FIGURE) such an identifier for the first user can also be received, for example a scan of an identification document such as an ID card, passport, driver's license or the like can be received, and/or the name and date of birth can be entered. An identifier for the motor vehicle 10 is also linked to the identifier for the first user 1. The data describing the settings made is also linked. Furthermore, the NFT can receive a unique identification number. Optionally, a user contract signed with the prominent previous owner can also be included in the NFT as a whole (for example in the form of a scan) and linked to the other data units mentioned. Based on the identification number, the NFT can be identified as an NFT which always applies to motor vehicles with prominent previous owners. Optionally, a parameter for indicating a prominence of the user of the motor vehicle can also be linked in the NFT, wherein the parameter indicates in this case the prominence of the first user 1. For other users, the NFT could be designed in the same way (in the same basic format), except that the other user would then be marked as not prominent. In the next step, the NFT is stored in the blockchain 30. This serves to ensure legal certainty in a manner known per se. The character 30 symbolizes distributed storage of the data. When the NFT is stored, the server 20 sends the data to the blockchain 30 and the blockchain 30 receives this data. After the transfer of ownership of the motor vehicle 10 from the first prominent user 1, possibly via person 3, to a second user 2 has taken place in step S18, the second user now wishes that the settings for the first user 1 are restored in the motor vehicle 10. The second user 2 can request this via the server 20 in the form of a platform of the car manufacturer (for example "MyAudi®"), optionally, according to step S20, a request can be sent from the motor vehicle to the server 20, which receives this request. In step S22, the server reads the data from the NFT, which data describes the setting originally made. In step S24, the server 20 sends this data to the motor vehicle 10, which receives the data. In step S26, the motor vehicle 10 automatically implements commands that are at least approximately described by the data, so that the settings are restored for the second user. In this way, the second user can assess what driving experience or passenger interior experience the prominent first user of the motor vehicle 10 has enjoyed.

Overall, the examples show how physical VIP/celebrity vehicle NFTs can be enforced.

The invention claimed is:

1. A method comprising:

making a setting regarding at least one actuator by a first user of a motor vehicle;

transmitting motor vehicle data to a server, wherein the motor vehicle data describe the setting regarding the at least one actuator by the first user of the motor vehicle;

minting a non-fungible token (NFT) that links an identifier for the first user with an identifier for the motor vehicle and with data for describing the setting made;

storing the NFT on a blockchain;

reading, by the server, the data from the NFT, wherein the data describe the setting made on the basis of the identifier for the motor vehicle;

sending, by the server, the data to the motor vehicle, which receives the data; and restoring the setting for use by a second user after transfer of ownership of the motor vehicle from the first user to the second user.

2. The method according to claim 1, wherein the setting involves a setting related to a color of lighting of a passenger compartment of the motor vehicle.

3. The method according to claim 2, wherein the setting involves a setting related to an intensity of the lighting of the passenger compartment of the motor vehicle.

4. The method according to claim 1, wherein the setting involves a setting related to a vehicle seat.

5. The method according to claim 1, wherein a parameter indicating a prominence of a previous user of the motor vehicle is linked in the NFT.

6. The method according to claim 5, wherein the parameter is binary.

7. The method according to claim 5, wherein the parameter indicates a degree of prominence.

8. The method according to claim 5, wherein the parameter is a word identifier or a letter code.

* * * * *